Aug. 11, 1936.  H. ADLER  2,050,249
ALKALINE TRISODIUM PHOSPHATE
Filed April 9, 1934
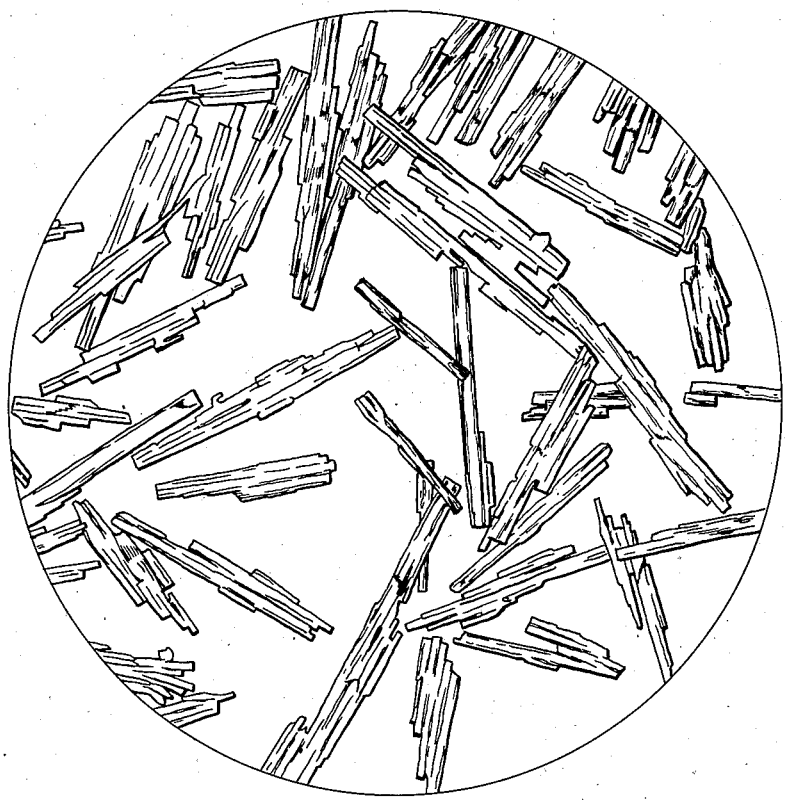
Inventor:
Howard Adler,
By Dyrenforth, Lee, Chritton & Wiles
Attys Patented Aug. 11, 1936

2,050,249

UNITED STATES PATENT OFFICE 2,050,249

ALKALINE TRISODIUM PHOSPHATE

Howard Adler, Chicago Heights, Ill., assignor to Victor Chemical Works, a corporation of Illinois Application April 9, 1934, Serial No. 719,782

7 Claims. (Cl. 23—107)

This invention relates to an improved alkaline trisodium phosphate product and a method of manufacturing the same.

Trisodium phosphate has previously been prepared by crystallization from solutions containing a slight excess of caustic soda, the product sometimes having the formula $$7(Na_3PO_4.12H_2O).NaOH.$$

Normally the alkalinity factor of such products will not exceed 1.048, the term "alkalinity factor" referring to the ratio of the total base present in the crystals or solutions to the theoretically correct amount of base required in pure trisodium phosphate with the formula $Na_3PO_4 12H_2O$.

A method of determining this factor is described in Adler U. S. Patent 1,909,996. The patent just referred to discloses another type of alkaline trisodium phosphate having an alkalinity factor of 1.06 which is crystallized from a solution having an alkalinity factor from 1.075 to 1.10. The products formerly obtained all theoretically had 12 mols of water of crystallization, but actually in drying it has proved impracticable to dry uniformly on account of the uneven sizes of the crystals of the material. As a result the products have been over-dried, and have a slightly opaque over-dried appearance, and contain less than 12 mols of water of crystallization.

It has now been discovered that what is apparently a double salt of caustic soda and trisodium phosphate having the approximate formula $$9(Na_3PO_4 12H_2O).2NaOH$$

may be produced in the form of long, thin needles, of uniform size and shape. This product can be dried to have a higher water content, is more free-flowing, has approximately one-half the apparent density, has less tendency to cake in storage, and dissolves much more rapidly in water than the crystalline trisodium phosphate heretofore produced. It has the further advantage that it may be produced more economically from solution in that it will crystallize out from its mother liquor to a far greater extent than ordinary trisodium phosphate. Flakes prepared in accordance with this invention have a length ranging from about 4 to 10 times the thickness, with an average ratio of about 5½ to 1. Needles of trisodium phosphate produced in the ordinary manner have an average ratio of less than 3 to 1, and the maximum is about 4 to 1.

The invention is illustrated in the drawing which shows a group of crystals of the new product magnified about 30 diameters. The material may be prepared from a strong trisodium phosphate solution of say 32–38° Bé. gravity strength at 60° C. This solution may be prepared as desired, for example by neutralizing phosphoric acid with soda ash until the disodium phosphate stage has been reached, and subsequently treating the solution of disodium phosphate with caustic soda. The resulting solution is then cooled to approximately its saturation temperature and a strong solution of caustic soda, for example of 35–50° Bé. strength (at a temperature of 35° C. or less) is then added while agitating. The caustic soda is added to the trisodium phosphate in an amount sufficient to give an alkalinity ratio to the resulting mixture greater than 1.20 and preferably above 1.50. The addition of the caustic soda solution causes the temperature of the mixture to rise rapidly. Care should be taken that the temperature of the final mixture does not rise above 70° C. It is preferred to accomplish this result by regulation of the temperatures of the original liquors.

As a result of the addition of the caustic soda, the solubility of the trisodium phosphate is very materially depressed, and very thin, long crystals of an alkaline trisodium phosphate of 1.07 plus alkalinity ratio begin to separate at once. The separation is so nearly complete that subsequent cooling of the mixture causes little or no tendency for additional material to build up upon them with the result that the separated crystals are of extremely uniform size. The crystals may be separated from the mother liquor by centrifuging, and are then washed with a small amount of water to remove excess free caustic. The crystals apparently correspond approximately to the following formula:

$$9(Na_3PO_4 12H_2O).2NaOH.$$

By operating in accordance with the above process, a separation of 85–95% of the trisodium phosphate present in the original liquor is secured, as compared to 65–70% in the present commercial processes. In other words, only one-half to one-seventh as much trisodium phosphate is re-circulated as in conventional processes, which results in greatly increased crystallizing capacity, for a given size of crystallizer installation.

The quantity and strength of the caustic soda solution may even be so adjusted that substantially all of the trisodium phosphate separates out, leaving a mother liquor of practically pure caustic soda, which may be concentrated and used over and over as the solubility depressant.

Obviously mother liquor with sufficient excess caustic and containing some trisodium phosphate may be used in the same manner. The process may also be carried out by adding sufficient caustic soda to a solution of disodium phosphate to carry the alkalinity ratio above 1.20, care being taken that the temperature of the resulting mixture is below 70° C. Likewise the mother liquor might be used to neutralize the disodium phosphate, fresh caustic solution being added thereafter.

The crystals obtained in this process are of such uniform size and shape that no screening operation for the separation of sizes is required. At the same time this uniformity in size and shape permits the efficient drying of all crystals to the same extent without the over-drying of small crystals. The long, thin shape of the crystals also prevents them from coming into as complete or intimate contact as is the case with the present commercial product. The present crystals, when handled in bulk, present the appearance of a pile of crystal-clear straw, having an apparent density of from 0.45 to 0.55, which is approximately one-half the apparent density of ordinary trisodium phosphate. This low density, with the lack of contact between the particles, causes the product to be free-flowing, with little tendency to cake even though the crystals contain approximately their full water of crystallization. The crystals are free-flowing and non-caking with a crystal water content equal to 54—55% of the total crystal weight, whereas the ordinary trisodium phosphate must in practice be dried to a crystal water content of not over 53.5% in order to be non-caking.

The present crystals dissolve in about one-third the time of the ordinary commercial crystals, the difference being apparently due to the fact that the large amount of free space permits rapid circulation of the solvent.

The following is a typical example of the process:

Thirty-one cubic feet of a trisodium phosphate solution having an alkalinity ratio of 1.04 and a Baumé gravity strength of 36.8° (at 62° C.) was cooled to 56° C. and 4.67 cubic feet of 49.6° Baumé caustic soda at 33° C. was rapidly added while slowly agitating the mixture. The temperature of the mixture rose to 70° C. The slurry was then passed to a centrifuge and the crystals wrung out at a temperature of 65° C. and washed with a small amount of water. A yield of 1275 pounds of fluffy product with an alkalinity ratio of 1,074 was obtained. The apparent density was 0.50. The resulting mother liquor had an alkalinity ratio of 11.3, indicating the presence of only a small amount of trisodium phosphate in solution. The crystal separation represented approximately 95% of the total trisodium phosphate present in the original liquor.

The foregoing detailed description has been given for clearness of understanding only, and no unnecessary limitations should be understood therefrom, but the appended claims should be construed as broadly as permissible, in view of the prior art.

What I claim as new and desire to secure by Letters Patent is:

1. The process of producing an alkaline trisodium phosphate which comprises adding a strong solution of caustic soda to a strong solution of trisodium phosphate, the caustic soda being added in sufficient quantity to cause the immediate and substantially complete separation of trisodium phosphate from the solution in the form of alkaline needle-like crystals.

2. The method as set forth in claim 1, where the trisodium phosphate solution has a Baumé gravity strength of from 32–38° measured at 60° C., and the caustic soda solution has a strength of 35–50° Baumé when measured at 30° C.

3. A method as set forth in claim 1, where the caustic soda is added in sufficient quantity to produce an alkalinity ratio in the resulting mixture above 1.20.

4. The method as set forth in claim 1, in which the proportions of trisodium phosphate and caustic soda are adjusted to produce an alkalinity ratio substantially of 1.50.

5. Alkaline trisodium phosphate in the form of long needle-like crystals having an average length of the order of 5½ times the average thickness, having an alkalinity ratio of 1.07, and having a density in bulk of approximately 0.45–0.55 and having essentially the formula $$9(Na_3PO_4.12H_2O).2NaOH.$$

6. Trisodium phosphate as set forth in claim 5, in which the crystals are clear and shiny and have a crystal water content of at least 54% by weight of the product.

7. Alkaline trisodium phosphate as set forth in claim 5, in which the crystals are substantially uniform in size.

HOWARD ADLER.